US009682699B2

(12) United States Patent
Nefcy et al.

(10) Patent No.: US 9,682,699 B2
(45) Date of Patent: Jun. 20, 2017

(54) METHODS AND SYSTEM FOR DOWNSHIFTING DURING REGENERATION

(71) Applicant: Ford Global Technologies, LLC, Dearborn, MI (US)

(72) Inventors: Bernard D. Nefcy, Novi, MI (US); Daniel Colvin, Farminton Hills, MI (US); Felix Nedorezov, Rochester Hills, MI (US); Todd McCullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 14/685,900

(22) Filed: Apr. 14, 2015

(65) Prior Publication Data

US 2016/0304085 A1 Oct. 20, 2016

(51) Int. Cl.
*B60W 10/04* (2006.01)
*B60W 10/08* (2006.01)
(Continued)

(52) U.S. Cl.
CPC ............. *B60W 20/30* (2013.01); *B60K 6/547* (2013.01); *B60W 10/08* (2013.01); *B60W 10/115* (2013.01); *B60W 20/14* (2016.01); *B60W 30/18127* (2013.01); *B60W 30/19* (2013.01); *B60K 2006/4825* (2013.01); *B60W 2510/104* (2013.01); *B60W 2510/1005* (2013.01); *B60W 2510/1015* (2013.01); *B60W 2710/083* (2013.01); *B60W 2710/1005* (2013.01); *B60W 2710/1011* (2013.01);
(Continued)

(58) Field of Classification Search
USPC ...... 701/22, 54, 68, 58, 160, 83–84; 477/15, 477/23, 174–175, 87, 107–110; 180/65.265; 903/930
See application file for complete search history.

(56) References Cited

U.S. PATENT DOCUMENTS 5,993,350 A * 11/1999 Lawrie ..................... B60K 6/40
180/65.25
6,019,698 A * 2/2000 Lawrie ..................... B60K 6/48
477/3
(Continued)

FOREIGN PATENT DOCUMENTS

JP 4-246720 * 9/1992 ............ B60W 10/06
JP 4-307169 * 11/1992 ............ B60W 10/06

OTHER PUBLICATIONS

The future is electric! The EV revolution in Norway—Explanations and lessons learned; Ole Henrik Hannisdahl; Håvard Vaggen Malvik; Guro BØe Wensaas; Electric Vehicle Symposium and Exhibition (EVS27), 2013 World; Year: 2013; pp. 1-13, DOI: 10.1109/EVS.2013.6914921.*

(Continued)

*Primary Examiner* — Cuong H Nguyen
(74) *Attorney, Agent, or Firm* — David Kelley; McCoy Russell LLP

(57) ABSTRACT

Systems and methods for shifting a transmission of a hybrid driveline that includes an electric machine that operates in a regeneration mode are presented. The systems and methods may adjust a feedforward motor torque command via an adaptive parameter in response to an error that is based on percentage of shift complete.

18 Claims, 4 Drawing Sheets

(51) Int. Cl.
*B60W 20/30* (2016.01)
*B60K 6/547* (2007.10)
*B60W 10/115* (2012.01)
*B60W 30/18* (2012.01)
*B60W 30/19* (2012.01)
*B60W 20/14* (2016.01)
*B60K 6/48* (2007.10)

(52) U.S. Cl.
CPC ........... *B60W 2710/1022* (2013.01); *B60Y 2300/18125* (2013.01); *Y10S 903/93* (2013.01)

(56) References Cited

U.S. PATENT DOCUMENTS

| | | | | |
|---|---|---|---|---|
| 6,077,191 | A * | 6/2000 | Minowa | B60W 10/06 477/107 |
| 6,332,860 | B1 | 12/2001 | Hubbard et al. | |
| 7,223,201 | B2 * | 5/2007 | Colvin | B60K 6/365 477/102 |
| 7,676,313 | B2 * | 3/2010 | Ortmann | B60K 6/365 477/15 |
| 7,967,722 | B2 * | 6/2011 | Tabata | B60K 6/445 477/15 |
| 8,328,688 | B2 | 12/2012 | Fujii et al. | |
| 8,364,361 | B2 | 1/2013 | Olson et al. | |
| 9,008,926 | B2 * | 4/2015 | Heap | B60K 6/26 192/3.51 |
| 2005/0101435 | A1 * | 5/2005 | Cowan | B60W 30/18 477/83 |
| 2006/0142117 | A1 * | 6/2006 | Colvin | B60K 6/365 477/107 |
| 2008/0090697 | A1 * | 4/2008 | Ortmann | B60K 6/365 477/15 |
| 2009/0118930 | A1 * | 5/2009 | Heap | B60K 6/365 701/54 |
| 2009/0118936 | A1 * | 5/2009 | Heap | B60K 6/365 701/54 |
| 2013/0296125 | A1 * | 11/2013 | Gibson | B60W 20/10 180/65.21 |
| 2013/0296127 | A1 | 11/2013 | Shelton et al. | |
| 2014/0274555 | A1 * | 9/2014 | Gibson | F16H 63/502 477/79 |
| 2015/0241651 | A1 * | 8/2015 | Kachmar | G02B 6/4432 385/100 |
| 2016/0068163 | A1 * | 3/2016 | Fujii | B60W 30/19 701/54 |
| 2016/0304076 | A1 * | 10/2016 | Nefcy | B60W 20/00 |
| 2016/0304085 | A1 * | 10/2016 | Nefcy | B60W 20/30 |

OTHER PUBLICATIONS

Advanced gear shifting and clutching strategy for parallel hybrid vehicle with automated manual transmission; Hyeoun-Dong Lee; Seung-Ki Sul; Han-Sang Cho; Jang-Moo Lee; Industry Applications Conference, 1998. Thirty-Third IAS Annual Meeting. The 1998 IEEE; Year: 1998, vol. 3; pp. 1709-1713 vol. 3, DOI: 10.1109/IAS.1998.729802.*

Hybrid automata of an integrated motor-transmission powertrain for automatic gear shift; Hong Fu; Guangyu Tian; Quanshi Chen; Yiding Jin; Proceedings of the 2011 American Control Conference; Year: 2011; pp. 4604-4609, DOI: 10.1109/ACC.2011.5991137.*

Design of hybrid position/force engagement controller for dry dual clutch transmission without diaphragm spring; Jiwon J. Oh; Seibum B. Choi; 2014 American Control Conference; Year: 2014; pp. 2618-2623, DOI: 10.1109/ACC.2014.6858783.*

Advanced gear-shifting and clutching strategy for a parallel-hybrid vehicle; Hyeoun-Dong Lee; Seung-Ki Sul; Han-Sang Cho; Jang-Moo Lee; IEEE Industry Applications Magazine; Year: 2000, vol. 6, Issue: 6; pp. 26-32, DOI: 10.1109/2943.877837.*

A high speed induction machine with two-speed transmission as drive for electric vehicles; B. Eberleh; Th. Hartkopf International Symposium on Power Electronics, Electrical Drives, Automation and Motion, 2006. SPEEDAM 2006. Year: 2006; pp. 249-254, DOI: 10.1109/SPEEDAM.2006.1649779.*

Nefcy, B. et al., "Input Torque Trim for Transmission Shift Control During Regenerative Braking," U.S. Appl. No. 14/686,054, filed Apr. 14, 2015, 22 pages.

Nefcy, B. et al., "Methods and System for Shifting a Hybrid Vehicle," U.S. Appl. No. 14/685,900, filed Apr. 14, 2015, 35 pages.

* cited by examiner

METHODS AND SYSTEM FOR DOWNSHIFTING DURING REGENERATION

FIELD

The present description relates to methods and a system for downshifting gears of hybrid vehicle that includes a fixed gear ratio transmission. The methods and systems may be particularly useful for hybrid vehicles that operate in a regeneration mode from time to time.

BACKGROUND AND SUMMARY

A hybrid vehicle may enter a regeneration mode from time to time. In regeneration mode, the vehicle's kinetic energy may be converted to electrical energy and stored for use at a later time. The vehicle may enter regeneration mode when a driver reduces demand torque to slow the vehicle or to reduce the vehicle's propensity to accelerate. For example, a vehicle may enter a regeneration mode in response to the vehicle approaching a stop sign and the driver lifting off the accelerator pedal. The vehicle may decelerate at a predetermined level after entering regeneration mode. As the vehicle decelerates, its transmission may downshift from a higher gear to a lower gear as vehicle speed decreases to keep engine and/or motor speed within a desired range. However, if transmission clutches do not transfer a desired amount of torque during the downshift, the driver may notice an objectionable driveline torque disturbance. Further, the driveline torque disturbance may be exacerbated in drivelines that include a driveline disconnect clutch, which increases the driveline inertia. Therefore, it may be desirable to provide a system and method of transmission downshifting that improves downshifting in a regeneration mode.

The inventors herein have recognized the above-mentioned issues and have developed a driveline operating method, comprising: adjusting torque applied to a transmission input shaft via a closed loop in response to a percentage of a transmission gear shift complete.

By adjusting motor torque in response to a percentage of a transmission gear shift that is complete, it may be possible to provide the technical result of reducing driveline torque disturbances during gear shifting of a fixed step ratio transmission. In particular, the pressure above stroke it takes to squeeze a clutch is directly related to the torque transmitted by a gear clutch. However, a gear clutch actuator may not have sufficient bandwidth to shape clutch slippage during a downshift to reduce driveline torque disturbances. One the other hand, an electric machine operating in a regeneration mode may have a higher torque bandwidth that may be utilized to manipulate torque transmitted via the gear clutch during shifting via adjusting electric machine torque. Thus, driveline torque disturbances may be reduced when a driveline is operating in a regeneration mode via adjusting electric machine torque.

The present description may provide several advantages. Specifically, the approach may reduce driveline torque disturbances during transmission gear downshifting. Additionally, the approach may include closed loop control to further reduce driveline torque disturbances. Additionally, the approach may include adapting control parameters so that open loop torque control may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
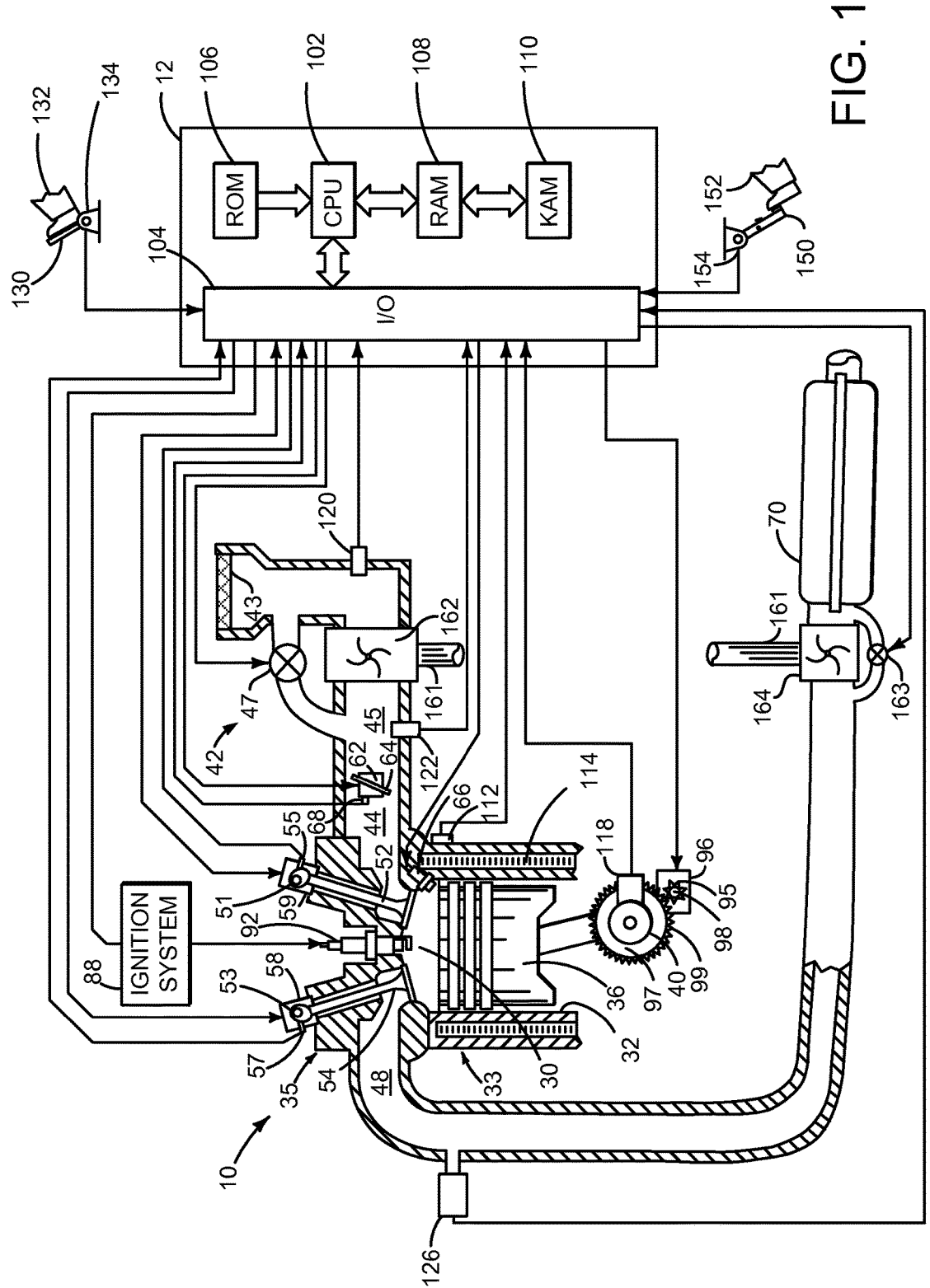
FIG. 1 is a schematic diagram of an engine.
Figure 2:
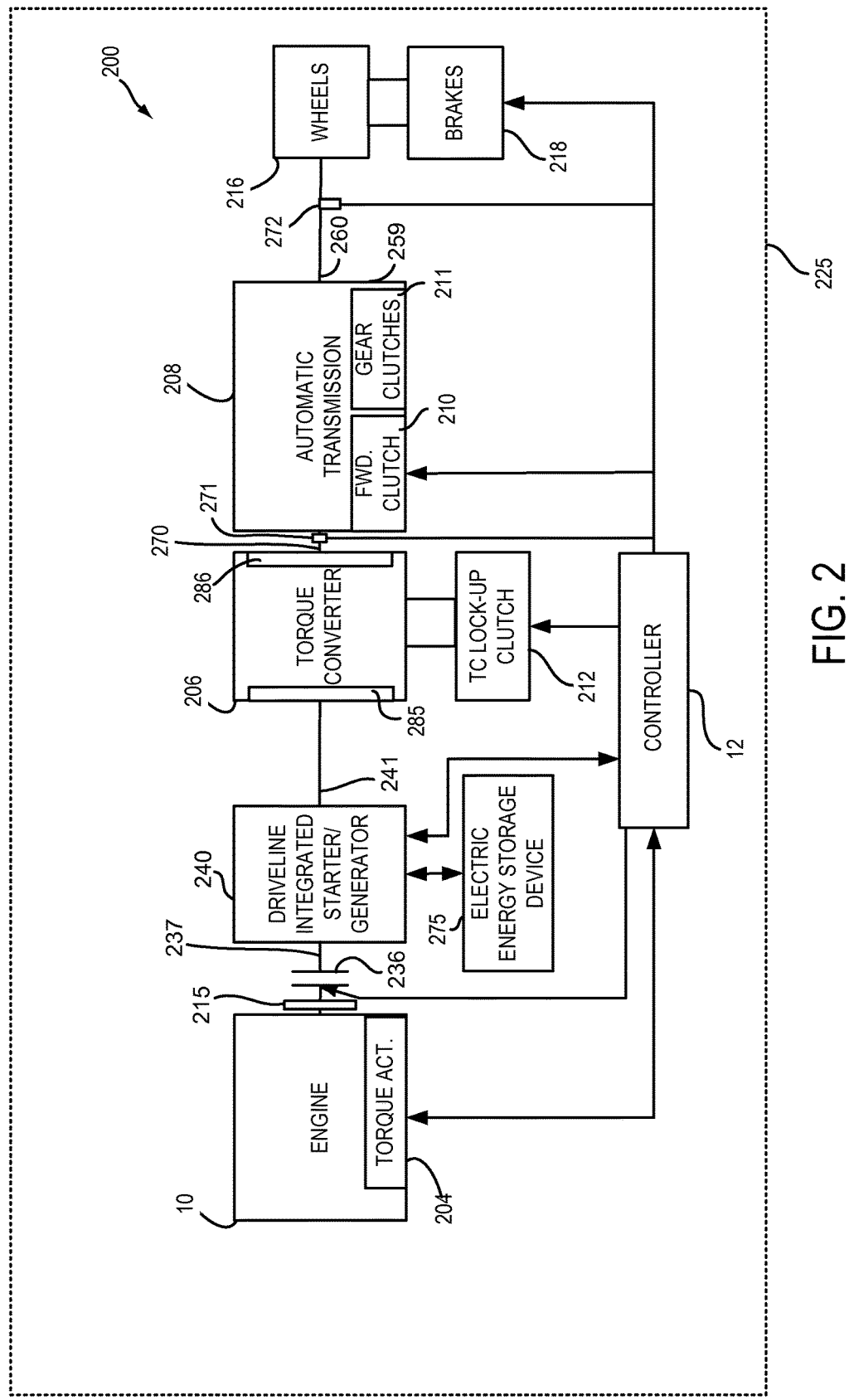
FIG. 2 is a schematic diagram of a hybrid vehicle driveline.

The present description is related to controlling downshifting of a fixed step ratio transmission of hybrid vehicle. The hybrid vehicle may include an engine as is shown in FIG. 1. The engine of FIG. 1 may be included in a powertrain or driveline as is shown in FIG. 2. The transmission may downshift and its control parameters may be adapted as shown in the example sequence shown in FIG. 3. FIG. 4 shows a method for shifting the transmission that is shown in FIG. 2.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 receives transmission input shaft position via position sensor 271. Controller 12 may convert transmission input shaft position into input shaft speed via differentiating a signal from position sensor 271. Controller 12 may receive transmission output shaft torque from torque sensor 272. Alternatively, sensor 272 may be a position sensor or torque and position sensors. If sensor 272 is a position sensor, controller 12 differentiates a position signal to determine transmission output shaft velocity. Controller 12 may also differentiate transmission output shaft velocity to determine transmission output shaft acceleration.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

The system of FIGS. 1 and 2 provides for a system, comprising: an engine; an electric machine; a disconnect clutch positioned in a driveline between the engine and the electric machine; a torque converter including a lockup clutch coupled to the motor; and a controller including executable instructions stored in non-transitory memory for adjusting an electric machine torque command during a regeneration mode in response to a closed loop percentage of shift complete error. The system includes where the closed loop percentage of shift complete error is based on a difference between a desired percentage of shift complete and an actual percentage of shift complete. The system further comprises additional instructions for determining an adjustment term based on the closed loop percentage of shift complete error. The system includes where the adjustment term is based on output of a proportional/integral/derivative controller. The system includes where the adjusting torque applied to the transmission is during a regeneration mode transmission gear downshift.

Figure 3:
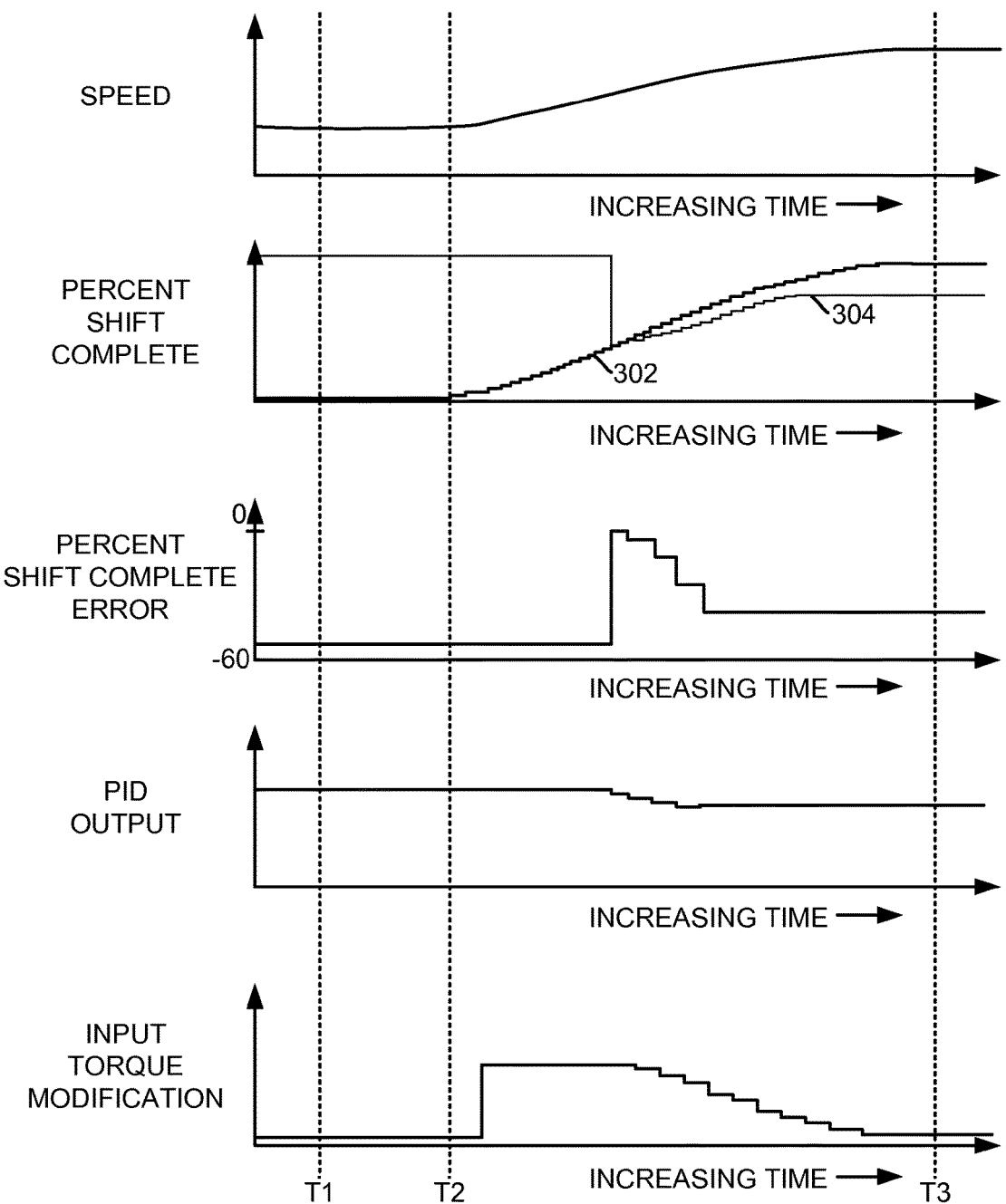
FIG. 3 is a plot of a simulated example transmission downshift.
Figure 4:
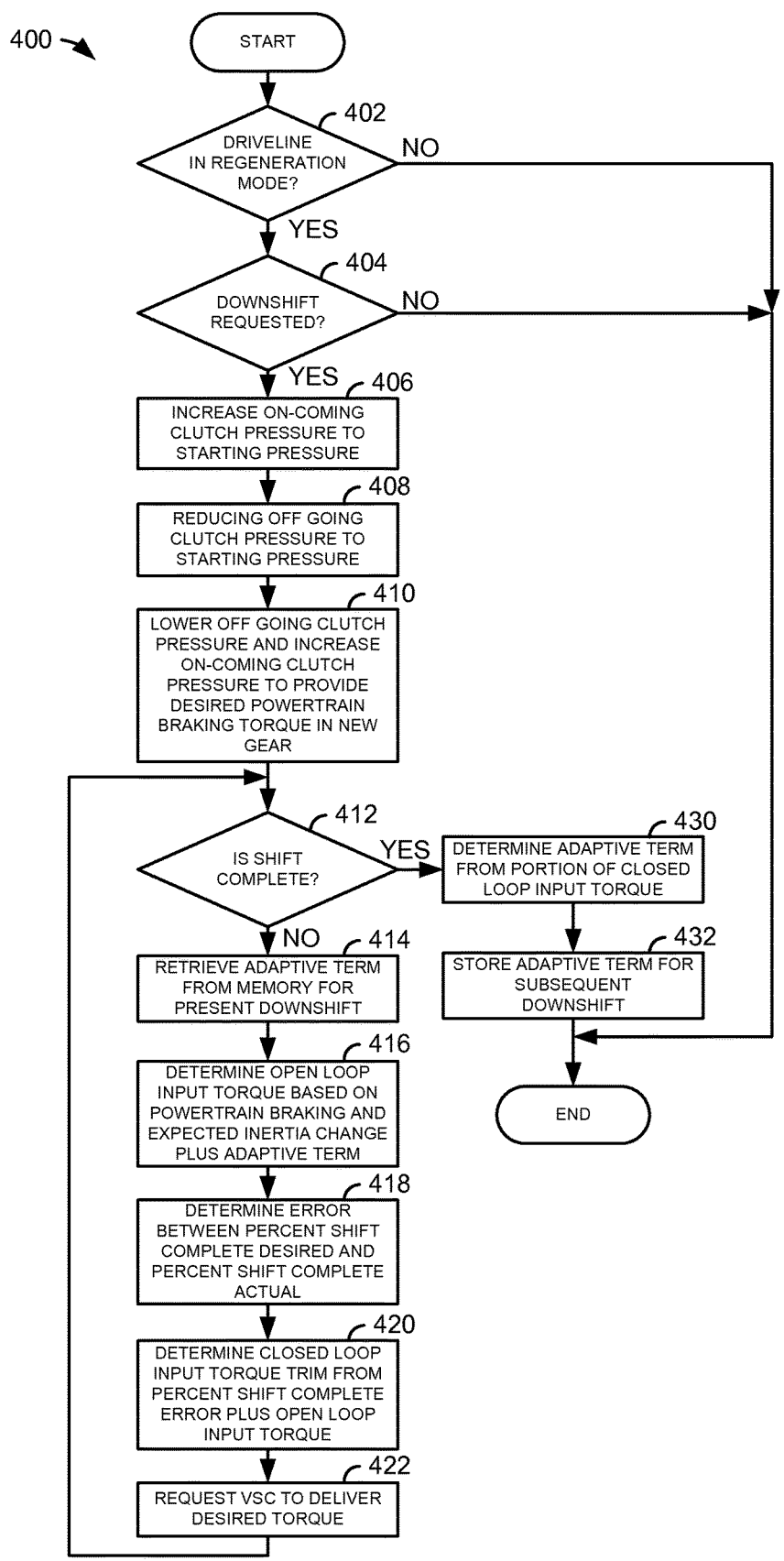
FIG. 4 is a method for operating a hybrid vehicle driveline.

Referring now to FIG. 3, a plot of a simulated example transmission downshift is shown. The hybrid system of FIGS. 1 and 2 is operating in a regeneration mode where the vehicle's kinetic energy is converted into electrical energy via an electric machine. The sequence of FIG. 3 may be provided via the system of FIGS. 1 and 2 operating according to the method of FIG. 4.

The first plot from the top of FIG. 3 is a plot of transmission input shaft speed versus time. The vertical axis represents transmission input shaft speed and transmission input shaft speed increases in the direction of the vertical axis arrow. The horizontal axis represents time and time increases from the left side of FIG. 3 to the right side of FIG. 3.

The second plot from the top of FIG. 3 is a plot of percent shift complete versus time. The vertical axis represents percent shift complete and percent shift complete increases in the direction of the vertical axis arrow. The horizontal axis represents time and time increases from the left side of FIG. 3 to the right side of FIG. 3. Thin line 304 represents desired percent shift complete and thick line 302 represents actual percentage shift complete.

The third plot from the top of FIG. 3 is a plot of percent shift complete error versus time. The vertical axis represents percent shift complete error. The horizontal axis represents time and time increases from the left side of FIG. 3 to the right side of FIG. 3.

The fourth plot from the top of FIG. 3 is a plot of proportional/integral/derivative (PID) controller output versus time. The vertical axis represents PID controller output. The horizontal axis represents time and time increases from the left side of FIG. 3 to the right side of FIG. 3.

The fifth plot from the top of FIG. 3 is a plot of transmission input shaft speed input torque modification versus time. The vertical axis represents transmission input shaft torque modification. The horizontal axis represents time and time increases from the left side of FIG. 3 to the right side of FIG. 3.

At time T1, the transmission gear downshift begins. The downshift may be based on driver demand torque (not shown), vehicle speed (not shown), and present gear selected (not shown). The transmission input shaft speed is at a lower value and the actual percent shift complete is zero. The desired percent shift complete is at a high value from a previous shift. The percent shift complete error is a low constant value reflecting that percent shifting error determination has not started. The PID output is a low value also indicating that percent shifting error determination has not commenced. The input torque modification is also at a low value because input torque modification has not started.

Between time T1 and time T2, excess holding pressure in the off-going clutch is relieved. Further, the on-coming clutch is stroked to a state just before torque starts to transfer across the on-coming clutch. The transmission input shaft speed, percent shift complete, percent shift complete error, PID output, and input torque modification values remain unchanged.

At time T2, the transmission input shaft begins to increase as the off-going clutch is being released and the on-coming clutch is being applied. The actual percent shift complete begins to increase and the desired percent shift complete is at a higher level based on the previous gear shift. The desired percentage shift complete may not be updated until the shift has partially completed as is shown in this example because the on-coming clutch closing timing may have more effect on end of shift timing than release of the off-going clutch. The percent shift complete error is at its previous value because it has not been updated. Similarly the PID output remains at its previous value and the transmission input shaft torque has not been modified.

Between time T2 and time T3, the desired percent shift complete value is updated based on the time since start of shift and the actual percent shift complete increases. Further, an error develops between the desired percent shift complete and the actual percent shift complete because the actual shift complete is greater than the desired percent shift complete after the desired shift percentage is adjusted down for the present downshift. The error begins at zero after desired percent shift complete is adjusted and increases in a negative direction before it reaches a constant value. The PID output also changes in response to the percent shift complete error. The input torque modification is adjusted to a constant value before the desired percent shift complete is adjusted for the present shift. The transmission input shaft torque modification is then reduced since the desired percent shift complete is greater than the actual percent shift complete.

At time T3, the transmission input shaft speed reaches an increased value based on the new gear, the desired percent shift complete, and the actual percent shift complete stop being updated. The percent shift complete error remains at a constant level and the PID output is also constant. The input torque modifier also reaches a final value of zero as the shift completes.

Thus, the open loop input torque modification may be adjusted in response to an error between desired percent shift complete and actual percent shift complete. The open loop input torque is modified by output of a PID controller that operates on the percent shift complete error. Further, an adaptive term may be stored to memory that adjusts the open loop input torque modification so that the open loop torque modifier may be improved for subsequent downshifts.

Referring now to FIG. 4, a method for operating a hybrid driveline is shown. The method of FIG. 4 may be stored in non-transitory memory of the system shown in FIGS. 1 and 2. Additionally, the method of FIG. 4 may perform the operating sequence shown in FIG. 3.

At 402, method 400 judges if the vehicle driveline is in a regeneration mode. The vehicle driveline may be in a regeneration mode when an electric machine is operated in a generator mode where the hybrid vehicle's kinetic energy is converted into electrical energy. The vehicle may enter regeneration mode during deceleration or times where driver demand torque is less than a threshold. If method 400 judges that the driveline is in regeneration mode, the answer is yes and method 400 proceeds to 404. Otherwise, the answer is no and method 400 proceeds to exit. Method 400 may judge if the driveline is in regeneration mode to determine if electric machine torque may be adjusted to modify an open loop transmission input shaft torque.

At 404, method 400 judges if a downshift is requested. A downshift may be requested in response to vehicle speed, driver demand torque, and a transmission shift schedule as determined from vehicle sensors. If method 400 judges that a downshift is requested, the answer is yes and method 400 proceeds to 406. Otherwise, the answer is no and method 400 proceeds to exit.

At 406, method 400 increases pressure applied to the on-coming clutch to stroke the on-coming clutch to a position just before where the on-coming clutch begins to transfer torque. In one example, method 400 adjusts operation of a solenoid valve to adjust on-coming clutch pressure. Method 400 continues to 408 after on-coming clutch pressure has been adjusted to a starting application pressure.

At 408, method 400 reduces pressure applied to the off-going clutch to release clutch holding pressure to a point just before the clutch begins to slip. In one example, method 400 adjusts operation of a solenoid valve to adjust off-going clutch pressure. Method 400 continues to 410 after off-going clutch pressure has been adjusted to a starting release pressure.

At 410, method 400 enters a torque transfer phase of the downshift where on-coming clutch pressure is further increased and off-going clutch pressure is further decreased. Torque provided at the transmission input shaft is delivered to the transmission output shaft to provide powertrain braking via the on-coming clutch. Method 400 continues to 412 as pressure begins to increase in the on-coming clutch and as pressure decreases in the off-going clutch.

At 412, method 400 judges if the transmission gear downshift is complete. In one example, method 400 judges that the downshift is complete when the transmission input speed is a speed indicating the new gear is engaged. For example, method 400 may judge that the shift is complete when transmission input shaft speed is equal to the transmission output shaft speed multiplied by the new gear ratio. Alternatively, method 400 may judge that the transmission downshift is complete when pressure applied to the on-coming clutch is greater than a threshold pressure. If method 400 judges that the shift is complete, the answer is yes and method 400 proceeds to 430. Otherwise, the answer is no and method 400 proceeds to 414.

At 414, method 400 retrieves an adaptive transmission input shaft torque modifier term from memory. The adaptive transmission input shaft torque modifier may be determined as is described at 420 or via an alternative method. Method 400 proceeds to 416 after the adaptive transmission input shaft torque modifier term is retrieved from memory.

At 416, method 400 determines open loop transmission input shaft torque based on powertrain braking and expected inertia change from downshifting from the present transmission gear to the new transmission gear. In one example, the open loop transmission input shaft torque modifier is given by the equation:

$$OL\_Tq\_Mod = f(shift\_id, input\_speed, input\_torq) + Adaptive\_term$$

where OL_Tq_Mod is the open loop torque modification to transmission input shaft torque, shift_id identifies the present gear and the new gear for the downshift, input_speed is the present transmission input shaft speed, and input_torq is the present transmission input shaft torque. The transmission input torque may be a sum of engine torque and electric machine torque. In addition, the shift_id parameter indicates whether the engine and electric machine are coupled to the transmission input shaft, or if only the electric machine is coupled to the transmission input shaft. Therefore, the different open loop torque values may be provided if only the electric machine is coupled to the transmission input shaft as compared to if the engine and electric machine are coupled to the transmission input shaft.

The function ƒ outputs an empirically determined torque modification value that may be added to the desired transmission input torque (e.g., a sum of engine and electric machine torque) to provide an adjusted desired transmission input torque. Alternatively, the open loop torque modification value may be multiplied with the desired transmission input torque to provide an adjusted desired transmission input torque. The electric machine torque is adjusted responsive to the adjusted desired transmission input torque so that the engine and the electric machine provide the adjusted desired transmission input torque. In one example the desired transmission input torque is based on driver demand torque (e.g., based on accelerator pedal position and vehicle speed). Method 400 proceeds to 418 after the open loop torque applied to the transmission input shaft is adjusted.

At 418, method 400 determines an error between a desired percent shift complete and an actual percent shift complete. In one example, the desired percent shift complete is empirically determined and stored to memory. The desired percent shift complete is a value that ranges from 0 (e.g., zero percent shift complete) to 1 (e.g., one hundred percent shift complete). The desired percent shift complete is based on a time since start of the downshift. For example, the desired percent shift complete may begin to increase X milliseconds after the start of the downshift. A plurality of desired percent shift complete values are stored in memory and the values may be based on the parameters shift_id, input_speed, and input_torq.

The actual percent shift completed is based on the equation:

$$Act\_shft\_comp = \frac{pres\_input\_speed}{input\_speed\_ng - input\_speed\_pg}$$

where Act_shft_comp is actual percent shift complete, pres_input_speed is the present transmission input shaft speed, input_speed_ng is transmission input shaft speed in the new gear, and input_speed_pg is transmission input shaft speed in the present gear. In one example, input_speed_ng and input_speed_pg may be determined via multiplying the transmission output shaft speed by the respective new gear ratio and the present gear ratio. Transmission input shaft speed may be determined via a speed sensor.

The percent shift complete error is the desired percent shift complete minus the actual percent shift complete. Method 400 proceeds to 420 after the percent shift complete error is determined.

At 420, method 400 determines the closed loop transmission input shaft torque adjustment based on the percent shift complete error plus the open loop input torque (e.g., adjusted desired transmission input torque determined at 416). In one example, the closed loop transmission input shaft torque adjustment is given by the equation:

$$CL\_torq\_adj = des\_is\_torq + PID\_torq$$

where CL_torq_adj is the closed loop transmission input shaft torque adjustment, des_is_torq is the desired transmission input shaft torque determined at 416 and PID_torque is output of a proportional/integral/derivative controller. The PID_torque value may be expressed as:

$$PID\_torq = Kp(psc\_error(t)) + Ki \int \left( psc\_error(t) + Kd \frac{d(psc\_error(t))}{dt} \right)$$

where psc_error is the percent shift complete error determined at 418, Kp is a proportionate gain, Ki is an integral gain, Kd is a derivative gain, and t is time. The present electric machine torque is adjusted based on the closed loop transmission input shaft torque adjustment.

At 422, method 400 requests a vehicle system controller (VSC) to provide the requested transmission input shaft torque based on the closed loop transmission input shaft torque adjustment. For example, the presently commanded transmission input shaft torque is adjusted by the closed loop transmission input shaft torque adjustment. The VSC may command an electric machine controller, or alternatively, the VSC may directly command the electric machine to the adjusted. Method 400 returns to 412 after the present transmission input shaft torque is adjusted.

At 430, method 400 judges whether or not to adjust the adaptive transmission input shaft torque modifier stored in memory (e.g., the value retrieved at 414). In one example, method 400 determines a control effort by multiplying an integrated percent shift complete error by a weighting factor. The result is then compared to upper and lower threshold values. If the result is greater than an upper threshold value, the adaptive transmission input shaft torque modifier is increased by a value of one (e.g., the adaptive adjustment term). On the other hand, if the result is less than the lower threshold value, the adaptive transmission input shaft torque modifier is decreased by a value of one (e.g., the adaptive adjustment term). The adaptive adjustment term is zero if the result is between the upper and lower thresholds, or if the shift does not complete. Method 400 proceeds to 432 after the adaptive adjustment term is determined.

At 432, method 400 stores the adaptive transmission input shaft torque modifier to memory. The value is stored in memory at a location based on shift_id, input_speed, and input_torq. Thus, the revised adapted transmission input shaft torque modifier term may be expressed as:

Adaptive_term_*m*(shift_id,input_speed,input_torq)= Adaptive_term_old(shift_id,input_speed,input_torq)+add_inc where Adaptive_term_m is the newly adapted transmission input shaft torque modifier, shift_id is the shift identification as described at 416, input_speed is transmission input shaft speed, input_torq is transmission input shaft torque, Adaptive_term_old is the adapted transmission input shaft torque modifier retrieved from memory at 414, and add_inc is an increment or decrement value (e.g., 1 or −1). Shift_id, input_speed, and input_torque are the basis for determining a unique address in memory that holds the adapted transmission input shaft torque for the present downshift conditions. Method 400 proceeds exit after the adapted transmission input shaft torque is stored to memory.

In this way, torque at a transmission input shaft may be adjusted to improve shifting during conditions where the hybrid vehicle is in a regeneration mode and downshifting. Further, a plurality of transmission shift torque adjustments may be provided based on particular transmission gear downshifts and transmission input conditions.

Thus, the method of FIG. 4 provides for a driveline operating method comprising receiving vehicle operating conditions to a controller via sensors in communication with the controller; adjusting a torque applied to a transmission input shaft via a closed loop loop (e.g., closed loop feedback based on percent shift complete error or a difference between a desired shift complete profile and an actual shift complete) in response to a percentage of transmission gear shift complete; and applying the torque to the transmission via a torque source, the torque source in communication with the controller. The method includes where the percentage of transmission gear shift complete is based on transmission output shaft speed in a new gear and transmission output shaft speed in a present gear. The method includes where the percentage of transmission gear shift is further based on dividing present transmission output shaft speed by the transmission output shaft speed in a new gear minus the transmission output shaft speed in the present gear. The method includes where adjusting torque applied to the transmission input shaft includes adjusting a torque of an electric machine.

In some examples, the method includes where the adjusting torque applied to the transmission input shaft is performed during a downshift of a fixed step ratio transmission. The method includes where the transmission input shaft is part of a transmission of a driveline operating in a regeneration mode. The method includes where vehicle's kinetic energy is converted to electrical energy in the regeneration mode.

The method of FIG. 4 also provides for a driveline operating method, comprising: receiving operating conditions to a controller via sensors in communication with the controller; operating an electric machine in a generator mode based on the operating conditions; downshifting a transmission coupled to the electric machine while the electric machine is operating in the generator mode; adjusting torque applied to a transmission input shaft via a controller in response to an error of percentage of transmission gear shift complete; and applying the torque to the transmission via a torque source, the torque source in communication with the controller.

The method includes where the error of percentage of transmission gear shift complete is based on a difference between a desired transmission gear shift complete value and an actual transmission gear shift complete value. The method includes where adjusting torque applied to the transmission input shaft includes adjusting a torque of the electric machine.

The method also includes where the error of percentage of a transmission gear shift complete is further input to a proportional/integral/derivative controller. The method further comprises providing an adaptive adjustment value from output of the proportional/integral/derivative controller. The method further comprises adjusting output torque of the electric machine in response to the adaptive adjustment value. The method includes where the adaptive adjustment value is stored and applied during a subsequent downshift. The method includes where the electric machine is selectively coupled to an engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method for a hybrid vehicle, comprising:
   receiving operating conditions to a controller via sensors in communication with the controller;
   adjusting a torque applied to a transmission input shaft via a closed loop in response to a percentage of transmission gear shift complete based on the operating conditions; and
   applying the torque to a transmission via a torque source, the torque source in communication with the controller, where the percentage of transmission gear shift complete is based on transmission output shaft speed in a new gear and transmission output shaft speed in a present gear, and where the percentage of transmission gear shift complete is further based on dividing present transmission output shaft speed by a transmission output shaft in a new gear speed minus the transmission output shaft speed in the present gear.

2. A driveline operating method for a hybrid vehicle, comprising:
   receiving operating conditions to a controller via sensors in communication with the controller;
   operating an electric machine in a generator mode based on the operating conditions;
   downshifting a transmission coupled to the electric machine while the electric machine is operating in the generator mode;
   adjusting torque applied to a transmission input shaft via the controller in response to an error of percentage of transmission gear shift complete; and
   applying the torque to the transmission via a torque source, the torque source in communication with the controller.

3. A system, comprising:
an engine;
an electric machine;
a disconnect clutch positioned in a driveline between the engine and the electric machine;
a torque converter including a lockup clutch coupled to a motor; and
a controller including executable instructions stored in non-transitory memory for adjusting an electric machine torque command during a regeneration mode in response to a closed loop percentage of shift complete error.

4. The method of claim 1, where adjusting torque applied to the transmission input shaft includes adjusting a torque of an electric machine.

5. The method of claim 1, where adjusting torque applied to the transmission input shaft is performed during a downshift of a fixed step ratio transmission.

6. The method of claim 5, where the transmission input shaft is part of the transmission of a driveline operating in a regeneration mode.

7. The method of claim 6, where a vehicle's kinetic energy is converted to electrical energy in the regeneration mode.

8. The system of claim 3, where the closed loop percentage of shift complete error is based on a difference between a desired percentage of shift complete and an actual percentage of shift complete.

9. The method of claim 2, where the error of percentage of transmission gear shift complete is based on a difference between a desired transmission gear shift complete value and an actual transmission gear shift complete value.

10. The method of claim 2, where adjusting torque applied to the transmission input shaft includes adjusting a torque of the electric machine, and where the torque source is the electric machine.

11. The method of claim 2, where the error of percentage of the transmission gear shift complete is further input to a proportional/integral/derivative controller.

12. The method of claim 11, further comprising providing an adaptive adjustment value from output of the proportional/integral/derivative controller.

13. The method of claim 12, further comprising adjusting output torque of the electric machine in response to the adaptive adjustment value.

14. The method of claim 13, where the adaptive adjustment value is stored and applied during a subsequent downshift.

15. The method of claim 2, where the electric machine is selectively coupled to an engine.

16. The method of claim 15, where adjusting torque applied to the transmission is during a regeneration mode transmission gear downshift.

17. The system of claim 8, further comprising additional instructions for determining an adjustment term based on the closed loop percentage of shift complete error.

18. The system of claim 17, where the adjustment term is based on output of a proportional/integral/derivative controller.

* * * * *